US012323714B2

(12) United States Patent
Nurmikko et al.

(10) Patent No.: US 12,323,714 B2
(45) Date of Patent: Jun. 3, 2025

(54) COMPACT OPTOELECTRONIC DEVICE FOR NONINVASIVE IMAGING

(71) Applicant: Brown University, Providence, RI (US)

(72) Inventors: Arto Nurmikko, Providence, RI (US); Ning Zhang, Providence, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 18/856,549

(22) PCT Filed: Apr. 20, 2023

(86) PCT No.: PCT/US2023/066014
§ 371 (c)(1),
(2) Date: Oct. 11, 2024

(87) PCT Pub. No.: WO2023/205736
PCT Pub. Date: Oct. 26, 2023

(65) Prior Publication Data
US 2025/0106530 A1   Mar. 27, 2025

Related U.S. Application Data

(60) Provisional application No. 63/332,902, filed on Apr. 20, 2022.

(51) Int. Cl.
*H04N 23/95* (2023.01)
*G06N 3/049* (2023.01)
(Continued)

(52) U.S. Cl.
CPC ............. *H04N 23/95* (2023.01); *G06N 3/049* (2013.01); *H04N 25/47* (2023.01)

(58) Field of Classification Search
CPC ........ H04N 23/95; H04N 23/21; H04N 25/47; H04N 25/773; G06N 3/049; G06T 5/60;
(Continued)

(56) References Cited

U.S. PATENT DOCUMENTS 5,948,006 A   9/1999   Mann
6,134,474 A   10/2000  Fischell et al.
(Continued)

FOREIGN PATENT DOCUMENTS

CN   101674573 B   5/2012
CN   102480740 A   5/2012
(Continued)

OTHER PUBLICATIONS

Zhang, et al., "Twenty-Four-Hour Ambulatory Recording of Cerebral Hemodynamics, Systemic Hemodynamics, Electrocardiogramd Actigraphy During People's Daily Activities", Journal of Biomedical Optics, vol. 19, No. 4, 2014, pp. 047003-1-047003-12.
(Continued)

*Primary Examiner* — Marly S Camargo
(74) *Attorney, Agent, or Firm* — Adler Pollock & Sheehan P.C.

(57) ABSTRACT

A system includes a high density surface emitting laser array source, the high density surface emitting laser array source comprising a near infrared vertical cavity semiconductor laser (VCSEL) array that enables individual access to closely packed laser elements on a sub-microsecond timescale, a detector comprising a dynamic vision sensor having low latency, high dynamic range and ultralow power, and a chip scale neuromorphic computing platform configured to perform real-time target image reconstruction, the distinctly separate high density surface emitting laser array source, the detector and the chip scale neuromorphic computing platform integrated into a single functional whole.

6 Claims, 5 Drawing Sheets

(51) Int. Cl.
   *G06T 5/60*     (2024.01)
   *G06V 10/82*    (2022.01)
   *H04N 25/47*    (2023.01)
   *H04N 25/773*   (2023.01)
   *H10F 30/225*   (2025.01)

(58) Field of Classification Search
   CPC ............... G06T 3/4046; G06T 9/002; G06T 2207/20084; G06T 2207/20081; G06T 2207/20064; G06T 2207/3004; G06V 10/82; H10F 30/225
   See application file for complete search history.

(56) References Cited

U.S. PATENT DOCUMENTS

| | | |
|---|---|---|
| 6,409,674 B1 | 6/2002 | Brockway et al. |
| 6,754,538 B2 | 6/2004 | Linberg |
| 7,020,505 B1 | 3/2006 | Phillips et al. |
| 7,212,851 B2 | 5/2007 | Donoghue et al. |
| 7,647,097 B2 | 1/2010 | Flaherty et al. |
| 7,751,877 B2 | 7/2010 | Flaherty et al. |
| 7,881,780 B2 | 2/2011 | Flaherty |
| 7,901,368 B2 | 3/2011 | Flaherty et al. |
| 7,989,936 B2 | 8/2011 | McCain |
| 7,991,461 B2 | 8/2011 | Flaherty et al. |
| 8,060,194 B2 | 11/2011 | Flaherty |
| 8,095,209 B2 | 1/2012 | Flaherty |
| 8,299,912 B2 | 10/2012 | Otto |
| 8,386,050 B2 | 2/2013 | Donoghue et al. |
| 8,412,302 B2 | 4/2013 | Kipke et al. |
| 8,547,248 B2 | 10/2013 | Zdeblick et al. |
| 8,560,041 B2 | 10/2013 | Harvey et al. |
| 8,738,139 B2 | 5/2014 | Lanning et al. |
| 8,812,096 B2 | 8/2014 | Flaherty et al. |
| 8,818,498 B2 | 8/2014 | Terada et al. |
| 8,958,868 B2 | 2/2015 | Ghovanloo et al. |
| 9,028,405 B2 | 5/2015 | Tran |
| 9,402,544 B2 | 8/2016 | Yee et al. |
| 9,808,199 B2 | 11/2017 | Kilsgaard et al. |
| 9,819,074 B2 | 11/2017 | Muller et al. |
| 9,878,167 B1 | 1/2018 | He et al. |
| 10,340,408 B1 | 7/2019 | Katnani et al. |
| 10,433,754 B2 | 10/2019 | Nurmikko et al. |
| 11,324,444 B2 | 5/2022 | Jensen et al. |
| 12,076,110 B2 | 9/2024 | Nurmikko et al. |
| 2002/0099412 A1 | 7/2002 | Fischell et al. |
| 2003/0216666 A1 | 11/2003 | Ericson et al. |
| 2003/0229382 A1 | 12/2003 | Sun et al. |
| 2004/0082875 A1 | 4/2004 | Donoghue et al. |
| 2004/0240527 A1 | 12/2004 | Giannakis et al. |
| 2005/0137652 A1 | 6/2005 | Cauller et al. |
| 2005/0143790 A1 | 6/2005 | Kipke et al. |
| 2005/0203366 A1 | 9/2005 | Donoghue et al. |
| 2005/0267597 A1 | 12/2005 | Flaherty et al. |
| 2005/0283203 A1 | 12/2005 | Flaherty et al. |
| 2006/0016753 A1 | 1/2006 | Sowemimo-Coker et al. |
| 2006/0018990 A1 | 1/2006 | Bazzo et al. |
| 2006/0049957 A1 | 3/2006 | Surgenor et al. |
| 2006/0058627 A1 | 3/2006 | Flaherty et al. |
| 2006/0094974 A1 | 5/2006 | Cain |
| 2006/0111075 A1 | 5/2006 | Seol |
| 2006/0149338 A1 | 7/2006 | Flaherty et al. |
| 2006/0167371 A1 | 7/2006 | Flaherty et al. |
| 2006/0173259 A1 | 8/2006 | Flaherty et al. |
| 2006/0195042 A1 | 8/2006 | Flaherty |
| 2006/0241356 A1 | 10/2006 | Flaherty |
| 2006/0264774 A1 | 11/2006 | Rosenberg |
| 2007/0156126 A1 | 7/2007 | Flaherty |
| 2007/0169333 A1 | 7/2007 | Donoghue et al. |
| 2007/0265543 A1 | 11/2007 | Vansickle et al. |
| 2008/0027347 A1 | 1/2008 | Harris et al. |
| 2009/0135886 A1 | 5/2009 | Robertson et al. |
| 2009/0157141 A1 | 6/2009 | Chiao et al. |
| 2009/0157145 A1 | 6/2009 | Cauller |
| 2010/0002302 A1 | 1/2010 | Duparre et al. |
| 2010/0063411 A1 | 3/2010 | Donoghue et al. |
| 2011/0307079 A1 | 12/2011 | Oweiss et al. |
| 2012/0203129 A1 | 8/2012 | Rennaker |
| 2012/0302858 A1 | 11/2012 | Kidmose et al. |
| 2013/0079849 A1 | 3/2013 | Perryman et al. |
| 2014/0094674 A1 | 4/2014 | Nurmikko et al. |
| 2014/0275812 A1 | 9/2014 | Stivoric et al. |
| 2014/0303452 A1 | 10/2014 | Ghaffari |
| 2016/0051192 A1 | 2/2016 | Kang et al. |
| 2016/0103487 A1 | 4/2016 | Crawford et al. |
| 2016/0143541 A1 | 5/2016 | He et al. |
| 2017/0014035 A1 | 1/2017 | Newberry |
| 2017/0031441 A1 | 2/2017 | Muller et al. |
| 2017/0171071 A1 | 6/2017 | Turon et al. |
| 2017/0231501 A1 | 8/2017 | Culver et al. |
| 2017/0337469 A1* | 11/2017 | Debes ................ G06N 3/049 |
| 2018/0049636 A1 | 2/2018 | Miller et al. |
| 2018/0288717 A1 | 10/2018 | Shellhammer |
| 2018/0333587 A1 | 11/2018 | Howard |
| 2019/0175902 A1 | 6/2019 | Lee et al. |
| 2019/0261860 A1 | 8/2019 | Culver et al. |
| 2019/0336001 A1 | 11/2019 | Zhou et al. |
| 2020/0036487 A1 | 1/2020 | Hammond et al. |
| 2020/0367749 A1 | 11/2020 | Nurmikko et al. |
| 2021/0093864 A1 | 4/2021 | Beauchamp et al. |
| 2021/0100952 A1 | 4/2021 | Brown |
| 2021/0120186 A1* | 4/2021 | Mitani ................ G02B 7/09 |
| 2021/0275070 A1 | 9/2021 | Schuurkamp et al. |
| 2021/0308468 A1 | 10/2021 | Shepard et al. |
| 2021/0338127 A1 | 11/2021 | Cavuto et al. |
| 2021/0398338 A1 | 12/2021 | Philion et al. |
| 2022/0016774 A1 | 1/2022 | Amell et al. |
| 2022/0095290 A1 | 3/2022 | Sato et al. |
| 2023/0171492 A1* | 6/2023 | Scheper ............. H04N 25/47 |
| 2024/0105861 A1* | 3/2024 | Zhou ................... H10F 55/18 |

FOREIGN PATENT DOCUMENTS

| | | |
|---|---|---|
| CN | 103169448 A | 6/2013 |
| EP | 3020450 A1 | 5/2016 |
| EP | 3150121 B1 | 10/2018 |
| JP | 2004313419 A | 11/2004 |
| JP | 2005261710 A | 9/2005 |
| JP | 2012249916 A | 12/2012 |
| JP | 2015015548 A | 1/2015 |
| JP | 6125670 B2 | 5/2017 |
| KR | 20090009940 A | 1/2009 |
| WO | 9202176 A1 | 2/1992 |
| WO | 03061517 A2 | 7/2003 |
| WO | 2008021524 A2 | 2/2008 |
| WO | 2012040401 A3 | 8/2012 |
| WO | 2016110804 A1 | 7/2016 |
| WO | 2016187254 A1 | 11/2016 |
| WO | 2017035530 A1 | 3/2017 |
| WO | 2021016544 A1 | 1/2021 |
| WO | 2022029486 A1 | 2/2022 |

OTHER PUBLICATIONS

Ramrakhyani, et al., "Design and Optimization of Resonance-Based Efficient Wireless Power Delivery Systems for Biomedical Implants", IEEE Transactions on Biomedical Engineering, vol. 5, No. 1, Feb. 2011, pp. 48-63.

Rishani, et al., "Wearable, Epidermal and Implantable Sensors for Medical Applications", retrieved from the linkhttps://arxiv.org/abs/1810.00321, Sep. 30, 2018, 48 pages.

Rizzolatti, et al., "Motor and Cognitive Functions of the Central Premotor Cortex", Current Opinion in Neurobiology, vol. 12, 2002, pp. 149-154.

Saha, et al., "Compact fast optode-based probe for single-photon counting applications", IEEE Photonics Technology Letters, vol. 30, Issue 17, Sep. 2018, pp. 1515-1518.

Saha, Sreenil, "Miniaturized Optical Probes for Near Infrared Spectroscopy", Ecole Polytechnique, Montreal (Canada), 2018, 167 pages.

(56) References Cited

OTHER PUBLICATIONS

Saha, et al., "Miniaturized Probe for Time-Domain Near-Infrared Spectroscopy", IEEE Biomedical Circuits and Systems Conference (BioCAS)., 2018, 4 pages.
Sen, et al., "Clinical Application of Near-Infrared Spectroscopy in Patients with Traumatic Brain Injury: a Review of the Progress of the Field", Neurophotonics, vol. 3,, 2016, pp. 031409-1-031409-5.
Shankar, et al., "Energy-Efficient Protocols for Wireless Communication in Biosensor Networks", IEEE, 12th IEEE International Symposium on Personal, Indoor and Mobile Radio Communications, PIMRC, 2001, pp. D114-D118.
Shin, et al., "Performance Enhancement of a Brain-Computer Interface Using High-Density Multi-Distance NIRS", Scientific Reports, vol. 7, 16545, 2017, 10 pages.
Sigurdsson, et al., "A Method for Large-Scale Implantation of 3D Microdevice Ensembles into Brain and Soft Tissue", Microsystems & Nanoengineering, vol. 6, Article No. 97, 2020, pp. 1-13.
Sigurdsson, et al., "Distributed Delivery of Intracortical Microdevices", 2018, 1 page.
Song, et al., "A Brain Implantable Microsystem With Hybrid RF/IR Telemetry for Advanced Neuroengineering Applications", Proc. 29th Ann. Int. Conf. IEEE EMBS, 2007, pp. 445-448.
Song, et al., "Development of a Chipscale Integrated Microelectrode/Microelectronic Device for Brain Implantable Neuroengineering Applications", IEEE Transactions on Neural Systems and Rehabilitation Engineering vol. 13, No. 2, 2005, pp. 220-226.
Stirling, et al., "Seizure Forecasting Using a Novel Sub-Scalp Ultra-Long Term EEG Monitoring System", Frontiers in Neurology, vol. 12, Article 713794, Aug. 2021, 11 pages.
Strangman, et al., "A Quantitative Comparison of Simultaneous BOLD fMRI and NIRS Recordings During Functional Brain Activation", Neuroimage, vol. 17, 2002, pp. 719-731.
Strangman, et al., "Depth Sensitivity and Source-Detector Separations for Near Infrared Spectroscopy Based on the Colin27 Brain Template", PLoS One, vol. 8, Issue 8, e66319, Aug. 2013, 13 pages.
Strangman, et al., "Near-Infrared Spectroscopy and Imaging for Investigating Stroke Rehabilitation: Test-Retest Reliability and Review of The Literature", Arch Phys Med Rehabil, vol. 87, Suppl 2, Dec. 2006, pp. S12-S19.
Strangman, et al., "Non-Invasive Neuroimaging Using Near-Infrared Light", Biological Psychiatry, vol. 52, 2002, pp. 679-693.
Strangman, et al., "Scalp and Skull Influence on Near Infrared Photon Propagation in the Colin27 Brain Template", Neuroimage, vol. 85, 2014, pp. 136-149.
Strangman, et al., "Wearable Brain Imaging with Multimodal Physiological Monitoring", Appl Physiol, vol. 124, 2018, pp. 564-572.
Tatum, IV, William O., "Long-Term EEG Monitoring: A Clinical Approach to Electrophysiology", Journal of Clinical Neurophysiology, vol. 18, No. 5, 2001, pp. 442-455.
Tomer, et al., "Advanced CLARITY for Rapid and High-Resolution Imaging of Intact Tissues", Nature Protocols, vol. 9 No. 7, Jul. 2014, pp. 1682-1697.
Torricelli, et al., "In Vivo Optical Characterization of Human Tissues from 610 to 1010 nm by Time-Resolved Reflectance Spectroscopy", Phys Med Biol, vol. 46, 2001, pp. 2227-2237.
Tsow, Francis, et al., "Wearable Functional Near-Infrared (FNIR) Technology and its Applications in Naturalistic Conditions", American Journal of Biomedical Science & Research, vol. 5, No. 1, Sep. 3, 2019, pp. 33-38.
Uchitel, et al., "Wearable, Integrated EEG-fNIRS Technologies: A Review", Sensors, vol. 21, No. 6106, Sep. 12, 2021, 19 pages.
Ulku, Arin C, et al., "A 512x512 S Spad Image Sensor with Integrated Gating for Widefield Flim", IEEE Journal of Selected Topics in Quantum Electronics, 2018, 12 pages.
Urban, et al., "Chronic Assessment of Cerebral Hemodynamics During Rat Forepaw Electrical Stimulation Using Functional Ultrasound Imaging", Neuroimage, vol. 101, Nov. 1, 2014, pp. 138-149.
Villringer, et al., "Non-Invasive Optical Spectroscopy and Imaging of Human Brain Function", Trends Neuroscience, vol. 20, No. 10, 1997, pp. 435-442.
Watanabe, et al., "Noninvasive Cerebral Blood Volume Measurement During Seizures Using Multichannel Near Infrared Spectroscopic Topography", Journal of Biomedical Optics, vol. 5, No. 3, Jul. 2000, pp. 287-290.
Weisdorf, et al., "Ultra-Long-Term Subcutaneous Home Monitoring of Epilepsy—490 Days of EEG from Nine Patients", Epilepsia, vol. 60, 2019, pp. 2204-2214.
White, et al., "Quantitative Evaluation of High-Density Diffuse Optical Tomography: In Vivo Resolution and Mapping Performance", Journal of Biomedical Optics, vol. 15, No. 2, 2010, pp. 026006-1-026006-14.
Wu, et al., "Quantitative Evaluation of Atlas-Based High-Density Diffuse Optical Tomography for Imaging of the Human Visual Cortex", Biomedical Optics Express, vol. 5, 2014, pp. 3882-3900.
Wyser, Dominik, et al., "Wearable and Modular Functional Near-Infrared Spectroscopy Instrument with Multidistance Measurements at four Wavelengths", Neurophotonics, vol. 4, No. 4, 2017, pp. 041413-1-pp. 041413-13.
Xie, et al., "Plasma-Assisted Atomic Layer Deposition of Al2O3 and Parylene C Bi-Layer Encapsulation for Chronic Implantable Electronics", Applied Physics Letters, vol. 101, 2012, pp. 093702-1-093702-5.
Yakovlev, et al., "Implantable Biomedical Devices: Wireless Powering and Communication", IEEE Communications Magazine, vol. 50, No. 4, Apr. 2012, pp. 152-159.
Yang, et al., "8.3 A 553F2 2-Transistor Amplifier-Based Physically Unclonable Function (PUF) with 1.67% Native Instability", IEEE International Solid-State Circuits Conference (ISSCC), Feb. 2017, pp. 146-147.
Yeon, et al., "Microfabrication, Assembly, and Hermetic Packaging of Mm-Sized Free-Floating Neural Probes", IEEE Biomedical Circuits and Systems Conference, 2017, pp. 1-4.
Yetisen, et al., "Wearables in Medicine", Advanced Materials, vol. 30, Article1706910, 2018, 26 pages.
Yin, et al., "A 100-Channel Hermetically Sealed Implantable Device for Chronic Wireless Neurosensing Applications", IEEE Trans. on Biomedical Circuits and Systems, vol. 7, No. 2, Apr. 2013, pp. 115-128.
Yin, et al., "Wireless Neurosensor for Full-Spectrum Electrophysiology Recordings during Free Behavior", Neuron, vol. 84, Issue 6, 2014, pp. 1-13.
Zack, et al., "National and State Estimates of the Numbers of Adults and Children with Active Epilepsy—United States, 2015", MMWR Morbidity and Mortality Weekly Report, vol. 66, No. 31, Aug. 11, 2017, pp. 821-825.
Zhang, et al., "Adaptive Filtering to Reduce Global Interference in Non-Invasive NIRS Measures of Brain Activation: How Well and When Does It Work?", NeuroImage, vol. 45, 2009, pp. 788-794.
Zhang, et al., "Coregistered Tomographic X-Ray and Optical Breast Imaging: Initial Results", Journal of Biomed Optics, vol. 10, No. 2, 2005, pp. 024033-1-024033-9.
Zhang, et al., "Development of Motion Resistant Instrumentation for Ambulatory Near-Infrared Spectroscopy", Journal of Biomedical Optics, vol. 16, No. 8, Aug. 2011, pp. 087008-1-087008-12.
Zhang, et al., "EEG/MEG Based Diagnosis for Psychiatric Disorders", Frontiers in Human Neuroscience, Editorial article, Nov. 2, 2022, 3 pages.
Zhang, et al., "Experimental Comparison of Using Continuous-Wave and Frequency-Domain Diffuse Optical Imaging Systems to Detect Heterogeneities", Optical Tomography and Spectroscopy of Tissue IV, Proceedings of SPIE, vol. 4250, 2001, pp. 219-238.
England, et al., "Epilepsy Across the Spectrum: Promoting Health and Understanding", Institute of Medicine (US) Committee on the Public Health Dimensions of the Epilepsies. Washington (DC): National Academies Press (US); 2012. The National Academies Collection: Reports funded by National Institutes of Health, 2012, 568 pages.
Petrantonakis, et al., "Single-Trial NIRS Data Classification for Brain-Computer Interfaces Using Graph Signal Processing", IEEE Transactions on Neural Systems and Rehabilitation Engineering : A Publication of the IEEE Engineering in Medicine and Biology Society, vol. 26, 2018, 10 pages.

(56) References Cited

OTHER PUBLICATIONS

Hao, et al., "Wireless Body Sensor Networks for Health-Monitoring Applications", Physiological Measurement, vol. 29, Issue 11, Oct. 9, 2008, pp. R27-R56.

Harrison, et al., "A Low-Power Integrated Circuit for a Wireless 100-Electrode Neural Recording System", IEEE Journal of Solid-State Circuits, vol. 42, No. 1, 2007, pp. 123-133.

Harrison, et al., "A Low-Power Low-Noise CMOS Amplifier for Neural Recording Applications", IEEE Journal of Solid-State Circuits, vol. 38, No. 6, 2003, pp. 958-965.

Harrison, et al., "Wireless Neural Recording With Single Low-Power Integrated Circuit", IEEE Transactions on Neural Systems and Rehabilitation Engineering, vol. 17, No. 4, Aug. 1, 2009, pp. 322-329.

Heelan, et al., "A Mobile Embedded Platform for High Performance Neural Signal Computation and Communication", Biomedical Circuits and Systems Conference (BioCAS), 2015, 4 pages.

Heelan, et al., "FPGA implementation of deep-learning recurrent neural networks with sub-millisecond real-time latency for BCI-decoding of large-scale neural sensors (104 nodes)", 40th Annual International Conference of the IEEE on Engineering in Medicine and Biology, 2018, pp. 1070-1073.

Hochberg, et al., "Neuronal Ensemble Control of Prosthetic Devices by a Human with Tetraplegia", Nature, vol. 442, No. 7099, 2006, pp. 164-171.

Houmani, et al., "Diagnosis of Alzheimer's Disease with Electroencephalography in a Differential Framework", PLoS One, vol. 13, No. 3, e0193607, Mar. 20, 2018, pp. 1-19.

Hu, et al., "Ambulatory Diffuse Optical Tomography and Multimodality Physiological Monitoring System for Muscle And Exercise Applications", Journal of Biomedical Optics, vol. 21, No. 9, 2016, pp. 091314-1-091314-14.

Hueber, et al., "Non-Invasive and Quantitative Near-Infrared Haemoglobin Spectrometry in the Piglet Brain During Hypoxic Stress, Using a Frequency-Domain Multidistance Instrument", Physics in Medicine and Biology, vol. 46, 2001, pp. 41-62.

Huppert, et al., "A Temporal Comparison of BOLD, ASL, and NIRS Hemodynamic Responses to Motor Stimuli in Adult Humans.", Neuroimage, vol. 29, 2006, pp. 368-382.

Ibrahim, et al., "Safe Inductive Power Transmission to Millimeter-Sized Implantable Microelectronics Devices", 37th Annual International Conference of the IEEE Engineering in Medicine and Biology Society (EMBC), 2015, pp. 817-820.

Izzetoglu, Kurtulus, et al., "Functional Near-Infrared Neuroimaging", In: Proc. 26th Annu. Int. Conf. IEEE Eng. Med. Biol. Soc., vol. 1-7, 2004, pp. 5333-5336.

Jeong, et al., "3-D Hermetic Packaging of Sub-mm Size Implantable Microelectronic Sensors by Atomic Layer Deposition (ALD) for Chronic Use", 2018, 1 page.

Jeong, et al., "Conformal Hermetic Sealing of Wireless Microelectronic Implantable Chiplets by Multilayered Atomic Layer Deposition (ALD)", Advanced Functional Materials, vol. 29, No. 1806440, 2018, pp. 1-10.

Kasten, et al., "Fabrication and Characterization of Individual Addressable Vertical Cavity Surface Emitting Laser Arrays and Integrated VCSEL/PIN Detector Arrays", Proc. SPIE, vol. 6484, 2007, pp. 64840C-1-64840C-6.

Kiani, et al., "Design and Optimization of a 3-Coil Inductive Link for Efficient Wireless Power Transmission", IEEE Transactions on Biomedical Circuits and Systems, vol. 5, No. 6, Dec. 2011, pp. 579-591.

Lecomte, et al., "Silk and Peg as Means to Stiffen a Parylene Probe for Insertion in the Brain: Toward a Double Time-Scale Tool for Local Drug Delivery", Journal of Micromechanics and Microengineering, vol. 25, No. 12, Oct. 19, 2015, pp. 1-12.

Lee, et al., "A Scalable and Low Stress Post-CMOS Processing Technique for Implantable Microsensors", Micromachines, vol. 11, No. 925, 2020, pp. 1-15.

Lee, et al., "An Implantable Wireless Network of Distributed Microscale Sensors for Neural Applications", 2019 9th International IEEE/EMBS Conference on Neural Engineering (NER),, 2019, pp. 871-874.

Lee, et al., "Asynchronous Large-Scale Networks for Spatially Distributed Autonomous Wireless RF Event Sensors", Under review at Nature Portfolio, posted on Oct. 13, 2022, 20 pages.

Lee, et al., "Neural Recording and Stimulation Using Wireless Networks of Microimplants", Nature Electronics, vol. 4, Aug. 2021, pp. 604-614.

Lee, et al., "Wireless Power and Data Link for Ensembles of Sub-mm scale Implantable Sensors near 1GHz", 2018 IEEE Biomedical Circuits and Systems Conference (BioCAS)., 2018, pp. 1-4.

Leon-Carrion, et al., "The Infrascanner, a Handheld Device for Screening in Situ for the Presence of Brain Haematomas", Brain, Injury, vol. 24, No. 10, Sep. 2010, pp. 1193-1201.

Leung, et al., "A CMOS Distributed Sensor System for High-Density Wireless Neural Implants for Brain-Machine Interfaces", ESSCIRC 2018—IEEE 44th European Solid State Circuits Conference (ESSCIRC)., 2018, pp. 230-233.

Li, et al., "Reconstructing Chromosphere Concentration Images Directly by Continuous-Wave Diffuse Optical Tomography", Optics Letters, vol. 29, No. 3, Feb. 1, 2004, pp. 256-258.

Liutkus, et al., "Imaging With Nature: Compressive Imaging Using a Multiply Scattering Medium", Scientific Reports, vol. 4, 5552, 2014, 7 pages.

Makeig, et al., "Linking Brain, Mind and Behavior", International Journal of Psychophysiology, vol. 73, 2009, pp. 95-100.

Malcolm, et al., "The Aging Brain Shows Less Flexible Reallocation of Cognitive Resources During Dual-Task Walking: A Mobile Brain/Body Imaging (MoBI) Study", Neuroimage, vol. 117, 2015, 13 pages.

Mateo, et al., "Entrainment of Arteriole Vasomotor Fluctuations by Neural Activity Is a Basis of Blood-Oxygenation-Level-Dependent "Resting-State" Connectivity", Neuron, vol. 96, No. 4, Nov. 15, 2017, 17 pages.

Mehta, et al., "Neuroergonomics: A Review of Applications to Physical and Cognitive Work", Frontiers in Human Neuroscience, vol. 7, Article 889, Dec. 2013, 10 pages.

Minnikanti, et al., "Lifetime Assessment of Atomic-Layer-Deposited Al2O3-Parylene C Bilayer Coating for Neural Interfaces using Accelerated Age Testing and Electrochemical Characterization", Acta Biomaterialia, vol. 10, Issue 2, Feb. 2014, pp. 960-967.

Moctezuma, Luis Alfredo, "Towards Universal EEG Systems with Minimum Channel Count Based on Machine Learning and Computational Intelligence", Doctoral theses at Norwegian University of Science and Technology, Trondheim, Aug. 2021, 178 pages.

Moradi, et al., "Antenna Design for Implanted Tags in Wireless Brain Machine Interface System", IEEE Antennas and Propagation Society International Symposium, 2013, pp. 2083-2084.

Moreau., et al., "Near-Infrared Measurements of Brain Oxygenation in Stroke", Neurophotonics, vol. 3, No. 3, 2016, pp. 031403-1-031403-8.

Murata, et al., "Changes in Cerebral Blood Oxygenation Induced by Deep Brain Stimulation: Study by Near-Infrared Spectroscopy (NIRS)", Keio Journal of Medicine, vol. 49, Suppl 1,, 2000, pp. A61-63.

Nagaoka, et al., "Development of a New Rehabilitation System Based on a Brain-Computer Interface Using Near-Infrared Spectroscopy", Advances in Experimental Medicine and Biology, vol. 662, 2010, pp. 497-503.

Naik, et al., "Intelligent Communication Module for Wireless Biosensor Networks", Biosensors, Chapter 13, Feb. 2010, pp. 225-240.

Neely, et al., "Recent Advances in Neural Dust: Towards a Neural Interface Platform", Current Opinion in Neurobiology, vol. 50, Jun. 2018, pp. 64-71.

Nemoto, et al., "Microvascular Shunts in The Pathogenesis of High Intracranial Pressure", Acta Neurochir Suppl, vol. 118, 2013, pp. 205-209.

Nolte, et al., "Holographic tissue dynamics spectroscopy", Journal of Biomedical Optics, vol. 16, Issue 8, 2011, pp. 087004-1-087004-13.

(56) References Cited

OTHER PUBLICATIONS

Nurmikko, et al., "Wireless Neurotechnology for Neural Prostheses" in Neurobionics: The Biomedical Engineering of Neural Prostheses, Neurobionics: The Biomedical Engineering of Neural Prostheses, First Edition, 2016, pp. 123-161.
Okada, et al., "Theoretical and Experimental Investigation of Near-Infrared Light Propagation in a Model of the Adult Head", Applied Optics, vol. 36, No. 1, Jan. 1, 1997, pp. 21-31.
Oto, Maria Meritxell, "The Misdiagnosis of Epilepsy: Appraising Risks and Managing Uncertainty", Seizure, vol. 44, 2017, pp. 143-146.
Patterson III, et al., "CMOS ICs for Brain Implantable Neural Recording Microsystems", Applications of CMOS circuits in Biology, R. Westervelt and H. Lee Eds., 2007, pp. 259-291.
PCT/US2012/029664, "International Search Report and Written Opinion Received for PCT Patent Application No. PCT/US2012/029664, dated Jul. 18, 2012", Jul. 18, 2012, 10 pages.
PCT/US2019/042051, "International Search Report and Written Opinion dated received for PCT Patent Application No. PCT/US2019/042051, mailed on Nov. 1, 2019", Nov. 1, 2019, 10 pages.
Peng, et al., "fNIRS-EEG Study of Focal Interictal Epileptiform Discharges", Epilepsy Research, vol. 108, 2014, pp. 491-505.
Piyare, et al., "On-Demand LoRa: Asynchronous TDMA for Energy Efficient and Low Latency Communication in IoT", Sensors, vol. 18, No. 3718, Nov. 1, 2018, pp. 1-22.
"IEEE Recommended Practice for Determining the Peak Spatial-Average Specific Absorption Rate (SAR) in the Human Head from Wireless Communications Devices: Measurement Techniques", IEEE 1528-2013, Sep. 2013, pp. 1-246.
"International Search Report and Written Opinion received for PCT Patent Application No. PCT/US2023/066014, mailed on Sep. 27, 2023", 13 pages.
"International Search Report and Written Opinion received for PCT Patent Application No. PCT/US2023/078505, mailed on Apr. 10, 2024", 11 pages.
"Neurological Devices", Food and Drug Administration, Aug. 4, 2021, 2 pages.
"Stratus: Changing the Way the World Looks at EEG Testing", retrieved from the link "https://stratusneuro.com/" on Sep. 9, 2023, 8 pages.
201280024098.3, "Office Action", Mar. 18, 2015, 9 pages.
Ahn, et al., "Optimal Design of Wireless Power Transmission Links for Millimeter-Sized Biomedical Implants", IEEE Transactions on Biomedical Circuits and Systems, vol. 10, No. 1, Feb. 2016, pp. 125-137.
Altman, et al., "Measurement in Medicine: The Analysis of Method Comparison Studies", Journal of Royal Statistical Soc Series, vol. 32, 1983, pp. 307-317.
Behzad, et al., "The Role of EEG in the Diagnosis and Management of Patients with Sleep Disorders", Journal of Behavioral and Brain Science, vol. 11, Oct. 19, 2021, pp. 257-266.
Benovitski, et al., "Ring and Peg Electrodes for Minimally-Invasive and Long-Term Sub-Scalp EEG Recordings", Epilepsy Research, vol. 135, 2017, pp. 29-37.
Bevilacqua, Frederic, et al., "In Vivo Local Determination of Tissue Optical Properties: Applications to Human Brain", Applied Optics, vol. 38, No. 22, Aug. 1, 1999, pp. 4939-4950.
Biederman, et al., "A Fully-Integrated, Miniaturized (0.125 mm2) 10.5 uW Wireless Neural Sensor", IEEE Journal of Solid-State Circuits, vol. 48, No. 4, Apr. 2013, pp. 960-970.
Bland, et al., "Agreement Between Methods of Measurement with Multiple Observations Per Individual", Journal of Biopharmaceutical Statistics, vol. 17, 2007, pp. 571-582.
Bland, et al., "Measuring Agreement in Method Comparison Studies", Statistical Methods in Medical Research, vol. 8, 1999, pp. 135-160.
Blodgett, et al., "Brain Imaging for Neural Tissue Health Assessment.", Micro-and Nanotechnology Sensors, Systems, and Applications X, Proceedings of SPIE, vol. 10639, 2018, pp. 106391G-1-106391G-9.
Bluestone, et al., "Three-Dimensional Optical Tomography of Hemodynamics in the Human Head", Optics Express, vol. 9, No. 6, 2001, pp. 272-286.
Borton, et al., "An Implantable Wireless Neural Interface for Recording Cortical Circuit Dynamics in Moving Primates", Journal of Neural Engineering, vol. 10, No. 026010, 2013, 16 pages.
Chen, Songtao, et al., "A Photonic Crystal Laser from Solution Based Organo-Lead Iodide Perovskite Thin Films", ACS Nano, American Chemical Society, vol. 10, No. 4, 2016, pp. 3959-3967.
Chen, et al., "Excitonic Gain and Laser Emission from Mixed-Cation Halide Perovskite Thin Films", Optica, vol. 5, No. 9, Sep. 2018, pp. 1141-1149.
Chestek, et al., "HermesC: Low-Power Wireless Neural Recording System for Freely Moving Primates", IEEE Transactions on Neural Systems and Rehabilitation Engineering, vol. 17, No. 4, Aug. 1, 2009, pp. 330-338.
Choi, Jeehyun, et al., "Noninvasive Determination of the Optical Properties of Adult Brain: Near-Infrared Spectroscopy Approach", Journal of Biomedical Optics, vol. 9, No. 1, 2004, pp. 221-229.
Choquette, K.D., "Vertical Cavity Surface Emitting Lasers (VCSELs)", Chapter 8 in Semiconductor Lasers: Fundamentals and Applications, (Woodhead Publishing Series in Biomaterials), 2013, pp. 316-340.
Chu, Baocheng, et al., "Cerebral Blood Flow on Xenon CT: Correlation with the Blood Flow Detected at the Common Carotid Artery on Ultrasonography", Kei J. Med., Suppl 1, 2000, pp. A64-A67.
Churchland, PS, et al., "A Critique of Pure Vision", In: Computational Neuroscience Series: Large Scale Neuronal Theories of the Brain, MIT Press, 1994, pp. 22-60.
Cohen, Jacob, "A Power Primer", Psychological Bulletin, vol. 112, No. 1, 1992, pp. 155-159.
Culver, et al., "Volumetric Diffuse Optical Tomography of Brain Activity", Optics Letters, vol. 28, No. 21, Nov. 1, 2003, pp. 2061-2063.
Cunningham, John E, et al., "Scaling Vertical Cavity Surface Emitting Laser Reliability for Petascale Systems", Applied Optics, vol. 45, No. 25, Sep. 1, 2006, pp. 6342-6348.
Dalla Mora, Alberto, et al., "Towards Next-Generation Time-Domain Diffuse Optics for Extreme Depth Penetration And Sensitivity", Biomedical Optics Express, vol. 6, Issue 5, 2015, pp. 1749-1760.
Duran, et al., "Compressive Imaging in Scattering Media", Optics Express, vol. 23, No. 11, May 22, 2015, pp. 14424-14433.
Duun-Henriksen, et al., "EEG Signal Quality of a Subcutaneous Recording System Compared to Standard Surface Electrodes", Journal of Sensors, vol. 2015, Article ID 341208, 2015, 10 pages.
Ebeling, et al., "Vertical-Cavity Surface-Emitting Laser Technology Applications with Focus on Sensors and Three-Dimensional Imaging", Japanese Journal of Applied Physics, vol. 57, 2018, pp. 08PA02-1-08PA02-11.
Eggebrecht, et al., "A Quantitative Spatial Comparison of High-Density Diffuse Optical Tomography and fMRI Cortical Mapping", Neuroimaging, vol. 61, 2012, pp. 1120-1128.
Eggebrecht, et al., "Mapping Distributed Brain Function and Networks with Diffuse Optical Tomography", Nature Photonics, vol. 8, May 18, 2014, 7 pages.
Handa, et al., "Open and Free EEG Datasets for Epilepsy Diagnosis", arXiv preprint arXiv:2108.01030v1, Aug. 2, 2021, 6 pages.
EP12758264.1, "Extended European Search Report", Sep. 1, 2014, 9 pages.
EPC, "Time-of-Flight Chips", Espros Photonics Corporation, Retrieved on Feb. 28, 2024, Available at <https://www.espros.com/sensor-products/chips/time-of-flight-chips/>, 5 pages.
Fang, et al., "Monte Carlo Simulation of Photon Migration in 3D Turbid Media Accelerated by Graphics Processing Units", Optics Express, vol. 17, No. 22, 2009, pp. 20178-20190.
Fang, et al., "Ultrathin, Transferred Layers of Thermally Grown Silicon Dioxide as Biofluid Barriers for Biointegrated Flexible Electronic Systems", Proceedings of the National Academy of Science, vol. 113, No. 42, Oct. 18, 2016, pp. 11682-11687.

(56) References Cited

OTHER PUBLICATIONS

Ferrari, et al., "A Brief Review on the History of Human Functional Near-Infrared Spectroscopy (fNIRS) Development and Fields of Application", Neuroimage, vol. 63, 2012, pp. 921-935.

Firbank, et al., "Measurement of the Optical Properties of the Skull in the Wavelength Range 650-950 nm.", PhysMedBio, vol. 38, 1993, pp. 503-510.

Franceschini, et al., "Diffuse Optical Imaging of the Whole Head", Journal of Biomedical Optics, vol. 11, No. 5, 2006, pp. 054007-1-054007-10.

Gao, et al., "A Theory of Multineuronal Dimensionality, Dynamics and Measurement", bioRxiv, Nov. 11, 2017, pp. 1-50.

Geib, et al., "Fabrication and Performance of 2-Dimensional Matrix Addressable Arrays of Integrated Vertical Cavity Lasers and Resonant Cavity Photodetectors", IEEE Journal of Selected Topics in Quantum Electronics, vol. 8, No. 4, 2002, pp. 943-947.

Ghamari, et al., "A Survey on Wireless Body Area Networks or eHealthcare Systems in Residential Environments", Sensors, vol. 16, Issue 6, Jun. 7, 2016, 34 pages.

Gliske, et al., "Variability in the Location of High Frequency Oscillations During Prolonged Intracranial EEG Recordings", Nature Communications, vol. 9, No. 2155, 2018, 14 pages.

Gramann, et al., "Cognition in Action: Imaging Brain/Body Dynamics in Mobile Humans", Rev Neuroscience, vol. 22, No. 6, 2011, pp. 593-608.

Granata, et al., "Management of the Patient with Medically Refractory Epilepsy", Expert Review of Neurotherapeutics, vol. 9, No. 12, Dec. 2009, pp. 1791-1802.

Grassi, et al., "Near-Infrared Spectroscopy and Skeletal Muscle Oxidative Function In Vivo in Health and Disease: A Review from an Exercise Physiology Perspective", Journal of Biomedical Optics, vol. 21, No. 9, Sep. 2016, pp. 091313-1-091313-20.

Gwin, et al., "Electrocortical Activity is Coupled to gait Cycle Phase During Treadmill Walking", Neuroimage, vol. 54, 2011, pp. 1289-1296.

Zhang, et al., "Study of Near Infrared Technology for Intracranial Hematoma Detection", Journal of Biomedical Optics, vol. 5, No. 2, 2000, pp. 206-213.

* cited by examiner

COMPACT OPTOELECTRONIC DEVICE FOR NONINVASIVE IMAGING

CROSS REFERENCE TO RELATED APPLICATIONS

This application is a National Phase filing under 35 U.S.C § 371 of International Application No. PCT/US2023/066014 filed Apr. 20, 2023, which claims priority from U.S. Provisional Patent Application Ser. No. 63/332,902, filed Apr. 20, 2022, the entire contents of which are incorporated herein by reference.

STATEMENT REGARDING GOVERNMENT INTEREST

Not applicable.

BACKGROUND OF THE INVENTION

The invention generally relates to imaging, and in particular to a compact optoelectronic device for noninvasive imaging.

In general, imaging and identifying targets of interest hidden in dense turbid media presents many obstacles. Targets could be subdermal sources in the body, vehicles in fog, objects in muddy waters, and so forth, obscured by the dominant light scattering from the surrounding medium. Much work has been directed at solving an inverse source problem, whether for noninvasive imaging of brain activity by near infrared spectroscopy or deploying time-gated detection to identify a vehicle moving in a fog. These approaches fall under the general heading of diffuse optical tomography (DOT) with state-of-the-art being severely challenged once the turbid media exceeds the equivalent of 60 photon mean free paths (attenuation$>e^{-6}$).

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a system including a high density surface emitting laser array source, the high density surface emitting laser array source comprising a near infrared vertical cavity semiconductor laser (VCSEL) array that enables individual access to closely packed laser elements on a sub-microsecond timescale, a detector comprising a dynamic vision sensor having low latency, high dynamic range and ultralow power, and a chip scale neuromorphic computing platform configured to perform real-time target image reconstruction, the distinctly separate high density surface emitting laser array source, the detector and the chip scale neuromorphic computing platform integrated into a single functional whole.

In another aspect, the invention features a neuromorphic imaging pipeline architecture including a scattering medium with dynamic targets, laser driving circuits linked to a vertical-cavity surface-emitting laser (VCSEL) array, the VCSEL array providing photon injection into the scattering medium, a dynamic vision sensor (DVS) camera to provide photon detection from the scattering medium, the DVS camera sending spike trains to a neuromorphic chip for data driven neuromorphic execution, a deep spiking neural network (DSNN) for target reconstruction (image/video) on the neuromorphic chip, and a consistent signal pipeline with only asynchronous spiking signals generated at hardware level are the data flow.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other aspects will now be described in detail with reference to the accompanying drawings, wherein.

DETAILED DESCRIPTION OF THE INVENTION

Figure 1:
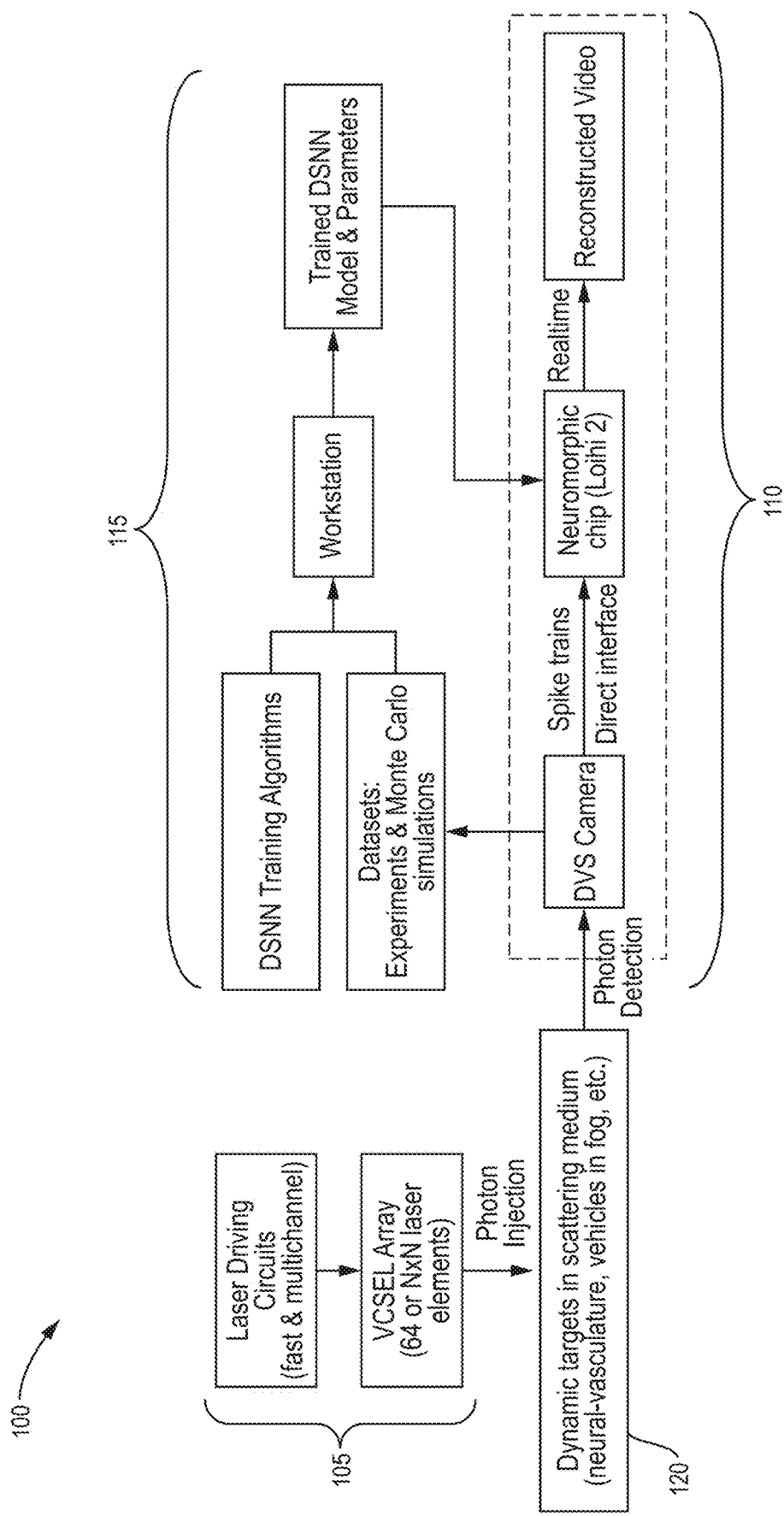
FIG. 1 illustrates an exemplary optoelectronic device of the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is directed towards a compact optoelectronic device for noninvasive imaging of, for example, brain activity, which integrates two unique chip scale optoelectronic components on one device platform, i.e., a high-density surface emitting laser array source, matched with a dynamic vision camera chip as the detector. The compact optoelectronic device overcomes the perennial major limitations of deep non-invasive bioimaging in dense, turbid media. The compact optoelectronic device is capable of resolving metabolic dynamics of target vasculature in a specific functional region of the neocortex with 100 micrometer spatial resolution. Real-time image reconstruction is implemented by a chip scale neuromorphic computing platform, with a goal to achieve time resolution down to 100 millisecond scale of neuronal relevance.

A primary aspect of the present invention is an imaging system where three disparate and distinctly separate technologies are integrated into a single functional whole. Specifically, these are a laser array source, a so-called dynamic vision camera and a neuromorphic computing platform. Each of these three technology components is interconnected to the others and is functionally interdependent of the other two.

An example of the interdependence and necessity for the three elements of the invention to be holistically co-designed is the following. The design and implementation of the VCSEL array is dependent of the integration of this array to the DVS camera. The DVS camera, in turn, must be designed and operated so that in can be synchronized, pixel by pixel with the VCSEL array, laser element by laser element. The DVS camera also needs to be electronically programmed to send the event-detected, spike train data as input to the neuromorphic processor for image reconstructions. For developing the algorithms for the neuromorphic processor the design of the VCSEL array is required in order to design a physics-informed computational basis.

Optoelectronic devices represent the forefront in technology. The photonic source is a unique near infrared ($\lambda$~850 nm) vertical cavity semiconductor laser array (VCSEL array) which enables individual electronic access to the approximately 100 closely packed laser elements on a sub-microsecond timescale. The two-dimensional gallium arsenide quantum well array occupies a 1×1 mm$^2$ chip area with individual laser aperture size 100 μm and inter-element pitch of 100 μm—the VCSEL array providing an ultrahigh-density multichannel optical source capable of fast, dynamically patterned coherent illumination.

The device of the present invention includes a dynamic vision (event-sensing) camera chip (DVS) to collect the backscattered infrared light from the turbid media (e.g., scalp, skull, dura, and the cortex). The camera chip and its integrated electronics record only the dynamical events of interest as "spikes," thereby subtracting the uninformative static or quasi-static background which often confounds standard detection approaches. In addition, the camera electronics are temporally synchronized with pulsed emission from each VCSEL laser element. This allows the "spiking" data be acquired as a matrix representation $S_{i,j} \cdot D_{k,1}$, where each source/detector pixel pair represents contribution from a separate photon source channel to the full image within the instrument's field of view.

The recorded data from the large channel count source-detector device is decoded by applying neuromorphic computing for target image reconstruction. In particular, the device deploys neuromorphic hardware (e.g., Intel's Loihi2 research chip) and uses purpose-specific algorithms for the neuromorphic processor chip running a model-based deep spiking neural network (DSNN) learning algorithm. Loihi2 is a neuromorphic research test chip designed by Intel Labs that uses an asynchronous spiking neural network (SNN) to implement adaptive self-modifying event-driven fine-grained parallel computations used to implement learning and inference with high efficiency.

As shown in FIG. 1, an exemplary optoelectronic device for noninvasive imaging 100 includes a high density surface emitting laser array source 105. This the high density surface emitting laser array source 105 includes a near infrared vertical cavity semiconductor laser (VCSEL) array that enables individual access to closely packed laser elements on a sub-microsecond timescale.

The optoelectronic device 100 includes a detector 110 that includes a dynamic vision camera chip having low latency, high dynamic range and ultralow power. The dynamic vision camera (chip) detects time-varying changes in optical constants (dynamic pulsations in blood flow oxy/deoxy hemoglobin; possible microemboli; moving targets behind fog) and send out asynchronous spike trains.

The optoelectronic device 100 includes a chip scale neuromorphic computing platform 115 configured to perform real-time target image reconstruction.

The optoelectronic device 100 enables noninvasive imaging of, for example, brain dynamics 120, or other physiological circuits (e.g., cardiac) though native metabolic biomarkers. The optoelectronic device 100 provides dynamic image reconstruction, replacing conventional image processing models/algorithms (such as DOT method) by neuromorphic event sensors (DVS) and SNN-based reconstruction.

The dynamic vision camera chip detects time-varying changes in optical constants, collects backscattered infrared light from a turbid media and records dynamic events of interest as spike data. As described above, the dynamic vision camera chip may be temporally synchronized with pulsed emission from each VCSEL array, enabling the spike data to be acquired as a matrix representation $S_{i,j} \times D_{k,1}$, where each source/detector pixel pair represents contribution from a separate photon source channel to a full image within the dynamic vision camera chip's field of view.

The chip scale neuromorphic computing platform 115 includes an asynchronous spiking neural network (SNN) for adaptive self-modifying event-driven fine-grained parallel computations used to implement learning and inference with high efficiency.

In the configuration discussed above, the optoelectronic device 100 provides a consistent pipeline, i.e., spiking signals (generated at hardware level) are the only data flow.

In summary, the present invention is a dynamical imaging system capable of recognizing and describing detail shapes and kinematics of moving objects in dense turbid media, or stationary objects in such media whose physical properties are internally time varying. The system may use light or other electromagnetic or sound waves for detecting and imaging an object of interest which is obscured by the scattering turbid media. Applications of interest include resolving detailed features and trajectory of a moving vehicle in fog, tracking submerged objects in murky waters or assess the performance of an active organ in the body.

As used herein, the phrase "dynamical imaging" means that the system specifically detects any and all time-varying aspects of the object to be recognized for reconstructing its detailed image.

As used herein, the phrase "turbid media" is equivalent to a dense fog, if light is used as the modularity in the system.

As used herein, the phrase "detecting and imaging" is synonymous to an ability to reconstruct details of the object by the system as if the turbid media ("fog") no longer obscured the object.

The system of the present invention is composed of a subsystem that combines a source (or arrays of sources) of energy (light, electromagnetic waves, sound) with a receiver (or arrays of receivers) using the same form of energy for detection with a subsystem composed of integrated signal processing and computing. The signal processing and computing subsystem captures the data from the source-detector subsystem and applies neuromorphic image reconstruction which is used to generate an image of the object of interest.

The source-receiver subsystem is a device where both the source and the receiver are composed of multiple elements. Energy transmitted from particular source element (or elements) through the turbid medium is detected by a particular receiver element (or elements) at a specific time. All the source-detector pair elements are precisely and mutually synchronized as the system receives signals from the environment of interest.

In principle, the system can scan across the entire accessible space though it would shorten the imaging time if there is some foreknowledge of its approximate location as per available auxiliary information.

The receiver is an electronic device including arrays of elements. Each element ("pixel") asynchronously converts the detected time-varying input introduced by the dynamics of the object of interest to current/voltage impulses (spikes). A spike can only be generated if the detected difference between the current measurement and the prior measurement, is larger than a preset threshold. The rate of repetition is proportional to the rate of change in the received intensity of light, sound, or other electromagnetic wave. The series of impulses are referred to as a "spike train."

Whereas the receiver can be viewed as established technology for a multipixel camera which detects dynamical changes in light intensity, i.e., "Dynamic Vision Sensor (DVS) or Event Camera," the present invention uses the sensors, such as DVS, for the first time, to image dynamic targets inside turbid media. The present invention leverages the uniqueness of DVS to only detect changes caused when the object is a dynamic (i.e., moving or changing shape/color). The DVS has natural ability to filter out the unwanted static signals and suppress the noise. It is asynchronous, very low latency (~1 μs), high dynamic range (120 dB) and features ultra-low power consumption.

The present invention also combines the DVS type receiver with a multi-element source array, and then uses the subsequent neuromorphic algorithms (physics-informed deep-learning spiking neural network) on a real neuromorphic computation chip (hardware) for image reconstruction of an object which is obscured by a surrounding turbid medium (for applications like biomedical imaging). The full pipeline only detects perturbation and ignores the useless background noise. It only uses spikes as signal which makes the system information-sparse and energy-efficient. It is asynchronous and low-latency which means it can output the reconstructed information in real real-time. From the front-end (spiking sensor) to the computational algorithms and hardware (neuromorphic chip), they are all ultra-low power consumption, which makes this system of the present invention very fit to be wearable, for example.

The information from all the source-receiver element pairs, converted to electronic spike train signals, provide the data driven input to the neuromorphic computing phase in the overall process to create a specific new class of algorithms for the problem of detection and imaging objects in turbid media.

Figure 2:
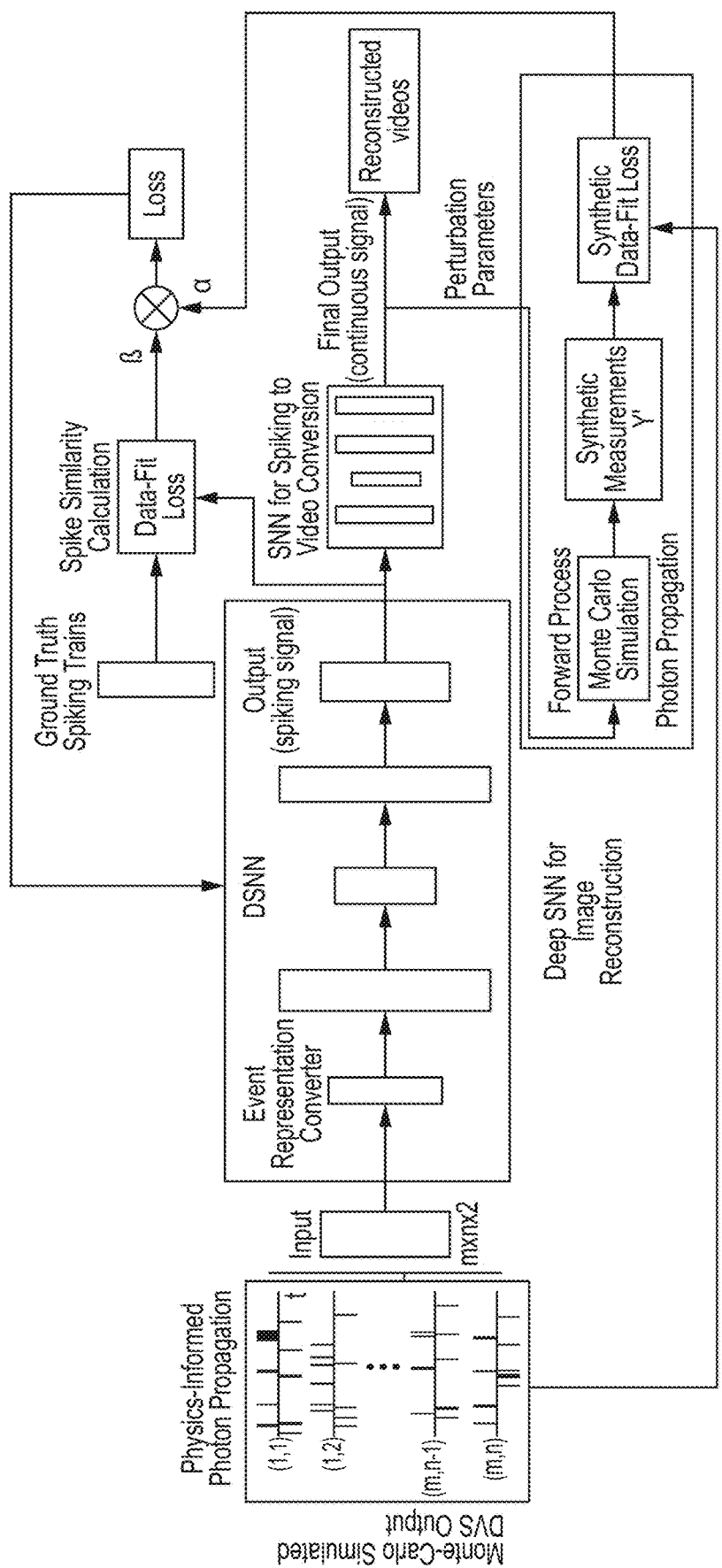
FIG. 2 illustrates an exemplary approach to building a Physics-Informed Deep Spiking Neural Network (PI-DSNN) algorithm architecture based on Monte Carlo simulations.

As shown in FIG. 2, the neuromorphic approach 200 represents a new type of data-driven deep-leaning algorithm (DSNN) which has several internal components. These components include a physics-informed propagation model for the source energy to propagate from the source to receiver as a means to characterize the turbid medium, the DSNN engine including spike-train encoding layer, the intermediate computing layer in latent representation, the spike-train similarity error-minimizing layer where the available training data is used to complete the image reconstruction of the object of interest as a last step.

Figure 3:
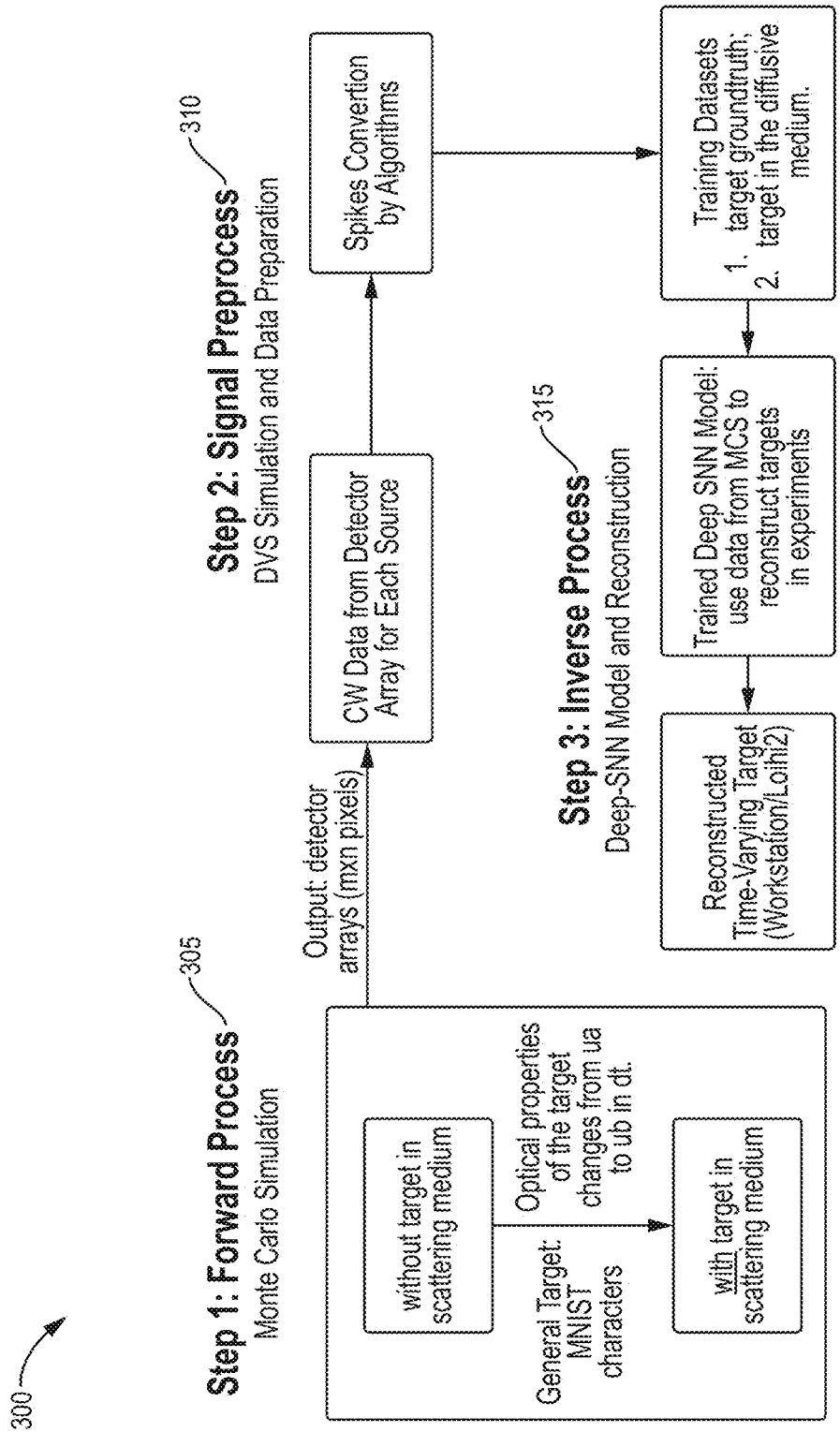
FIG. 3 illustrates an exemplary data preparation/processing/computing pipeline of the present invention.

In FIG. 3, an exemplary data processing/computing pipeline 300 illustrates how we prepared the physics informed datasets and how we used this to train the DSNN. The data processing/computing pipeline 300 includes a forward process 305, a signal pre-process 310 and an inverse process 315. The forward process 305 includes a Monte Carlo simulation. The signal pre-process 310 includes a DVS simulation and data preparation. The inverse process 315 includes a deep-SNN model and reconstruction.

The forward process 305 shows the photon propagation from the VCSEL microlasers through scattering inside tissue to the DVS camera. In principle, either simulations and experiments can accomplish the forward process, but as it is highly impractical to collect large data sets through experiments, we use simulated data, well-grounded in the physics of photon scattering, to train the DSNN. We use the 'Monte Carlo Extreme' toolkit (MCX) for speed and accuracy to build our forward model. A target such as a tumor or vessel is embedded in the scattering medium with its optical properties varying in time intervals $\Delta t$ depending of the physiological dynamics. The optical 'perturbation' arises from variation in index of refraction and the absorption coefficient and is detected by the DVS detector array (up to million pixels). A large number of datasets (>60000) is generated by MCS for training.

In signal pre-processing 310, spiking encoding algorithms such as step-forward (SF) encoding and temporal-contrast (TC) encoding are used to encode the continuous signals into spiking signals. The obtained datasets include targets embedded in transparent medium (ground truth) and in diffusive medium (training/testing). Artificial noise and channel reduction can be added.

In the inverse process 315, the DSNN model uses the simulated datasets to train and test itself. The output of the network is the reconstructed target. A sufficiently well-trained DSNN (as a nonlinear method) can be expected to solve the inverse problem accurately and efficiently. The DSNN outputs will be updated in real time according to the latest arrival spike trains at its inputs. The final output will be a real time reconstructed video-type image of the time-varying target.

It should be noted that the datasets preparation can include methods other than Monte Carlo simulation, for example, analytical methods based on diffusion equation and experiment datasets.

In the configuration discussed above, the optoelectronic device 100 provides a consistent pipeline, i.e., spiking signals (generated at hardware level) are the only data flow. This neuromorphic imaging pipeline design includes the VCSEL array and drivers for raster scanning or patterned illumination (e.g., the head in brain imaging), the DVS camera that sends spike trains to the Intel Loihi2 neuromorphic chip for data driven neuromorphic execution, and the DSNN design and methods of generating training data sets (green boxes). The spike layer error reassignment ('SLAYER') framework is used in designing a backpropagation-based DSNN. In turn the DSNN is trained at a cloud-based computing cluster. At the end, the optimal DSNN model is selected and deployed, for example, on a wearable Loihi2 platform.

Figure 4:
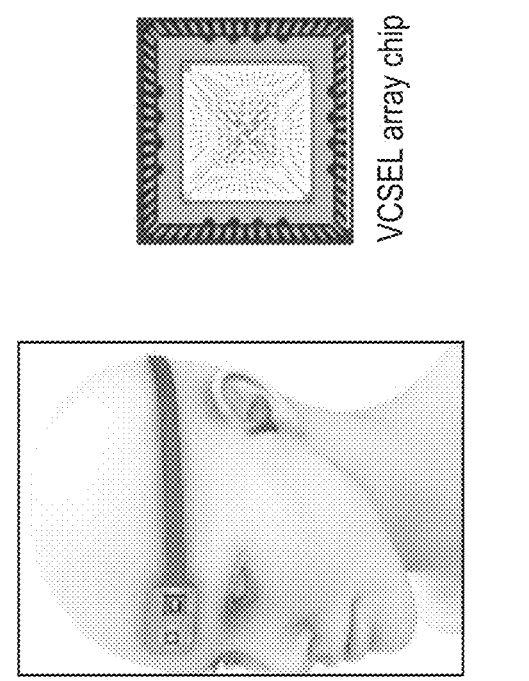
FIG. 4 shows a schematic of an exemplary wearable skin patch.

FIG. 4 shows a schematic of a wearable skin patch capable of high-resolution tomography and brain recording for a mobile subject. For illustrative purpose only, the main photonic component chips are facing outward (surface emitting laser array and dynamic vision camera chip, respectively.)

Figure 5:
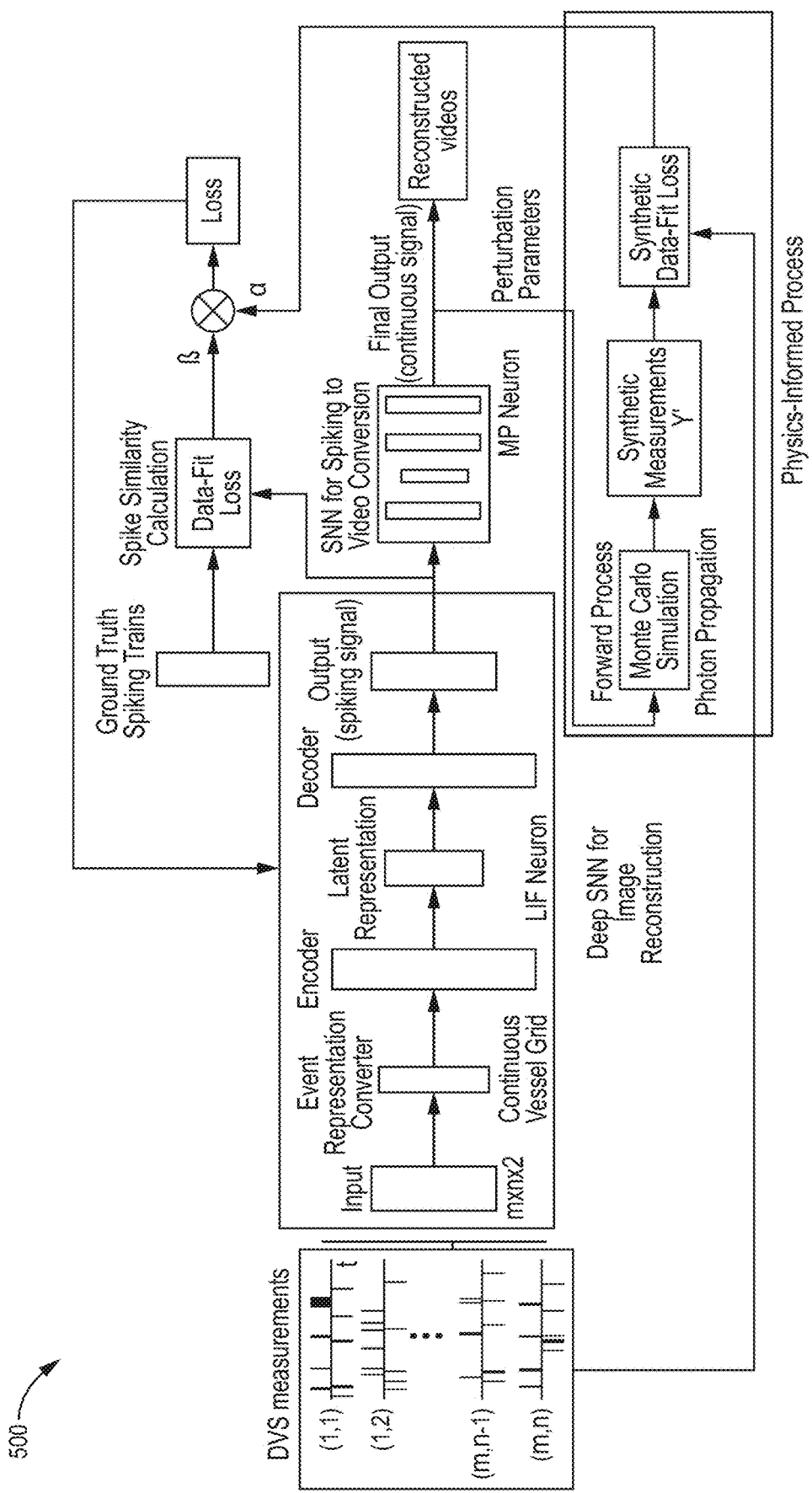
FIG. 5 illustrates an exemplary neuromorphic approach of the present invention for general purpose.

FIG. 5 describes an approach 500 to building a Physics-Informed Deep Spiking Neural Network (PI-DSNN) algorithm architecture, beginning from DVS measurement block with inputs are from the camera. Each pixel forms an individual input channel. The spiking signal from a DVS (or after encoding the simulated data) is a function of position and time coordinates, f [x, y, t, p], where p is the spike polarity. In the DSNN block the mxn spike trains are converted into continuous voxel grids using an event representation converter, to train and test our model. The voxel grids are passed into Ne encoder layers, Ni latent representations, and Na decoder layers for starting the reconstruction process. (All spikes modeled as leaky integrate-and-fire (LIF) neurons). The DSNN block outputs spike trains which are (1) compared with ground truth spike trains directly to calculate the spike similarity as the data-fit loss; (2) fed into the next stage SNN block for actual image/video reconstruction as the final output. The reconstruction layer of the SNN embeds membrane potential (MP) neurons who's role is to convert spikes into continuous signals. In the simplest training scenario, the data-fit loss can be fed into the DSNN directly to train the network. However, bioimaging targets are likely to be complex in geometry and the background tissue heterogeneous. Therefore, a physics-informed layer is added to provide physical a priori knowledge to the DSNN to guide the algorithm toward solutions which are physically realistic. Here the predicted parameters (extracted from the reconstructed videos) are fed into a forward process i.e., the Monte Carlo simulation (MCS) that describes photon transport in scattering media. Including the iterative 'perturbations' from the previous looping through the DSNN, the MCS simulates and updates the synthetic measurements (from simulated VCSEL/DVS sensor array). Then the computationally efficient, time saving synthetic measurements can be (less frequently) compared with actual DVS measurements to extract another loss parameter: synthetic data-fit loss. The 'faster tempo' data-fit loss and 'slower tempo' synthetic data-fit loss is then weighted and combined as a final loss to update the DSNN.

Although only a few embodiments have been disclosed in detail above, other modifications are possible. All such modifications are intended to be encompassed within the following claims.

What is claimed is:

1. A system comprising:
    a high density surface emitting laser array source, the high density surface emitting laser array source comprising a near infrared vertical cavity semiconductor laser (VCSEL) array that enables individual access to closely packed laser elements on a sub-microsecond timescale;
    a detector comprising a dynamic vision sensor having low latency, high dynamic range and ultralow power; and
    a chip scale neuromorphic computing platform configured to perform real-time target image reconstruction, the distinctly separate high density surface emitting laser array source, the detector and the chip scale neuromorphic computing platform integrated into a single functional whole.

2. The system of claim 1 wherein the dynamic vision camera chip detects time-varying changes in optical constants.

3. The system of claim 2 wherein the dynamic vision camera chip collects backscattered infrared light from a turbid media and records dynamic events of interest as spike data.

4. The system of claim 3 wherein the dynamic vision camera chip is temporally synchronized with pulsed emission from each VCSEL array, enabling the spike data be acquired as a matrix representation $S_{i,j} \times D_{k,1}$, where each source/detector pixel pair represents contribution from a separate photon source channel to a full image within the dynamic vision camera chip's field of view.

5. The system of claim 4 wherein the chip scale neuromorphic computing platform comprises an asynchronous spiking neural network (SNN) for adaptive self-modifying event-driven fine-grained parallel computations used to implement learning and inference with high efficiency.

6. A neuromorphic imaging pipeline architecture comprising:
    a scattering medium with dynamic targets;
    laser driving circuits linked to a vertical-cavity surface-emitting laser (VCSEL) array, the VCSEL array providing photon injection into the scattering medium;
    a dynamic vision sensor (DVS) camera to provide photon detection from the scattering medium, the DVS camera sending spike trains to a neuromorphic chip for data driven neuromorphic execution;
    a deep spiking neural network (DSNN) for target reconstruction (image/video) on the neuromorphic chip; and
    a consistent signal pipeline with only asynchronous spiking signals generated at hardware level are the data flow.

* * * * *